Figure 1:
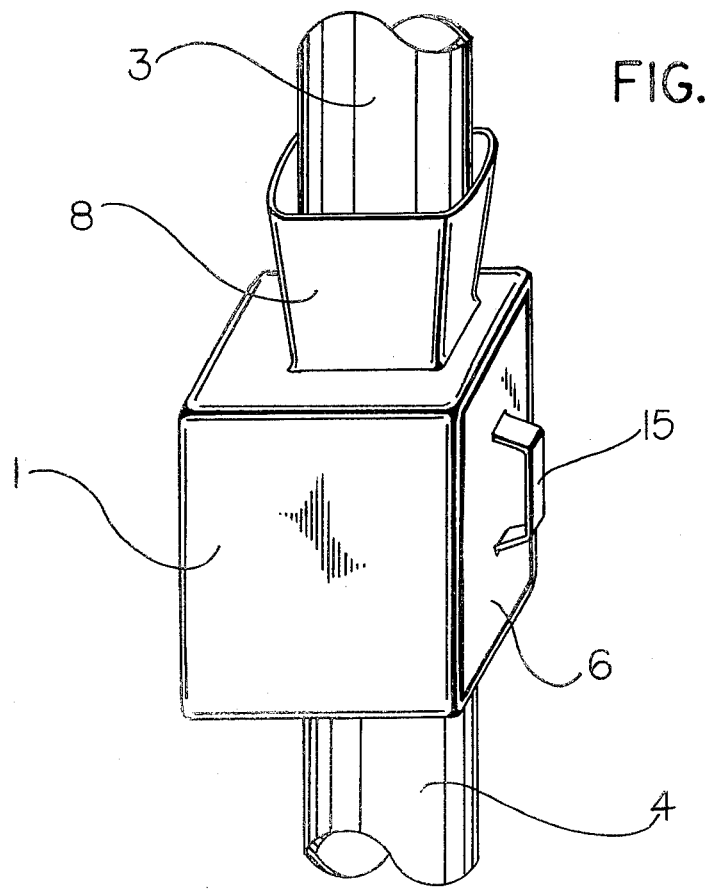

United States Patent [19]

Francesconi, Jr.

[11] Patent Number: 4,460,469

[45] Date of Patent: Jul. 17, 1984

[54] LEADER PIPE INSERT

[76] Inventor: Marino Francesconi, Jr., 94 Oak Dr., Pleasantville, N.Y. 10570

[21] Appl. No.: 314,233

[22] Filed: Oct. 23, 1981

[51] Int. Cl.³ .............................................. B01A 35/02
[52] U.S. Cl. .................................. 210/447; 210/455; 210/470
[58] Field of Search ............... 210/446, 447, 455, 470

[56] References Cited

U.S. PATENT DOCUMENTS

| 527,400 | 10/1894 | Barth | 210/447 X |
| 543,922 | 8/1895 | Buckley | 210/447 X |
| 694,440 | 3/1902 | Stair | 210/447 |
| 1,076,075 | 10/1913 | Steele | 210/447 |
| 1,231,356 | 6/1917 | Houge | 210/447 |
| 3,628,668 | 12/1971 | Huppert | 210/446 |
| 3,762,564 | 10/1973 | Weedon et al. | 210/446 |

Primary Examiner—John Adee
Attorney, Agent, or Firm—George E. Ham

[57] ABSTRACT

An apparatus is disclosed for separating leaves, debris, dirt, and sediment from rain water. The apparatus is comprised of a drawer-containing accumulating device insertable in the leader pipe bringing rain water from a roof by way of a gutter. The drawer in the device contains a screen for separating leaves and debris from rain water. The drawer is periodically removed and emptied.

1 Claim, 3 Drawing Figures

LEADER PIPE INSERT

The present invention relates to improvements in apparatus insertable in a leader pipe connecting or inserted between a rain water leader pipe and the standpipe for receiving the discharged rain water from the leader pipe, from whence the rain water is finally discharged into a sewer or other water collecting means.

Numerous devices have been proposed for the handling and collection of leaves and other debris in gutters. U.S. Pat. No. 4,036,761, issued July 19, 1977, described a guard for guttering having a U-shaped clip for holding the guard in rotational contact with the front edge of a gutter. The guard is comprised of a screen component attached to the front edge of the gutter.

U.S. Pat. No. 3,977,135, issued Aug. 31, 1976, describes a device consisting of a screen hinged to one side of a gutter. The hinges are spring-loaded to retain the screen against the gutter. The patent furthermore provides for lifting of the screen upwards by means of a cable to remove debris from the screen.

U.S. Pat. No. 4,032,456, issued June 28, 1977, describes a flip-up gutter shield comprised of a mesh cover over a gutter mounted by means of strap hinges.

U.S. Pat. No. 4,116,008, issued Sept. 26, 1978, describes an apparatus and method for manipulating a gutter to facilitate dumping of debris from the gutter.

All of these devices suffer from several important drawbacks. First, mounting the devices, which must protect the entire gutter, is oftentimes difficult, since the indicated devices are often long, large, and unwieldy. Furthermore, the presence of a roof overhang may render the installation and use of such devices difficult or impossible. In addition, when the debris is thrown from the screen or other device, it may soil the house wall and ground below. Such debris may damage the paint surface of the house wall, as well as shrubs, flowerbeds, etc., below. Cleanup is necessarily laborious, because of the wide area affected, as well as the difficulty of removing the leaves and debris from flowerbeds, shrubs, grass, etc.

U.S. Pat. No. 3,341,020, issued Sept. 12, 1967, describes an anti-clogging device for downspouts and similar drains and includes a rotatable shaft mounted in a housing for the purpose of clearing the unit of leaves and similar debris. It is proposed that the power for rotating the shaft be provided by a wind vane. No means is provided for accumulating and separating of leaves and debris. The unit would appear to be subject to many difficulties in operation, since wind would hardly be a reliable power source, limbs could lead to clogging, etc.

Prior art devices of the general class of this disclosure conventionally include a pipe section coaxial with the leader pipe and standpipe. In these devices the leader pipe exits into one end of the pipe section and the other end of the pipe section leads into the standpipe. A screen or other separating device is supported in the pipe section for the purpose of retaining and removing leaves, debris, dirt, sediment, etc., which are suspended in the rain water accumulating in the gutter from the roof and carried in to the leader pipe. The prior art teaches that the pipe section may include an outlet port means above the screen through which accumulated debris may be removed from time to time. For this purpose, a slidable cover sleeve over the outlet port in the pipe section may be moved to expose the accumulated debris on the screen or other accumulating means, allowing removal of the debris and followed by sliding the cover sleeve back into a closed position for renewed use in filtering rain water.

In ordinary use, the screen must be frequently cleaned, lest the pipe section become clogged and inoperative preventing the passage of rain water through the device. Typically, the rain water with suspended debris then backs up in the pipe section and leader pipe leading to spillage from the outlet port or at connecting points to the leader pipe above the section. Such rain water containing accumulated leaves and other debris may then stain the building exterior and cause damage to painted surfaces, leading to blistering and peeling. The backed-up debris may also cause erosion and staining of the leader pipe and erosion of the soil below. Furthermore, if rain water and debris back up and fill the gutter, damage to any part of the house wall below the gutter may occur, as well as erosion along the building foundation.

U.S. Pat. No. 3,628,668, describes an improvement whereby an annular chamber surrounding one pipe section end is provided, as well as an inlet port between the screen and other pipe section end. The annular chamber is connected to the inlet port means. A slidable cover sleeve is further provided which extends into the annular chamber in a covering position over the outlet port means. In such a device accumulated debris is removed manually by lifting the cover sleeve to gain access to the outlet port of the pipe section. Furthermore, in this device, any rain water spilling out of the outlet port means and running down the pipe section wall will be gathered in the annular chamber and directed back into the pipe section through the inlet port means. This equipment and method of removing debris, however, as well as other prior art equipment and methods, suffer from certain inherent limitations. For example, the most practicable means of removing debris, leaves, etc. from the screen in such cases is through insertion of the hand, either bare or protected with gloves, into the outlet port. There is danger in such cases of injury to the hand, wrist, or arm on contact with sharp or otherwise exposed edges, which may be of metal or other hard, unyielding material. Furthermore, the act of removing debris through the outlet port can lead to accidental spillage in the annular space leading to undesired clogging. Furthermore, the leaves so removed must be then transferred to a suitable container, exterior to the equipment, for later disposal. This requires the person doing the cleaning to be exposed to the elements, often under dangerous or undesirable circumstances, and to work with dirty, wet debris.

These and other disadvantages are readily overcome in accordance with the present invention, which provides a drawer-containing accumulating device insertable and coaxial with the leader pipe and the standpipe, with the leader pipe leading into one end of the drawer-containing accumulating device and the other end of the device leading into additional leader pipe or into the standpipe. A special feature of the drawer-containing accumulating device is that it is of two separable components, one a housing and the other a drawer containing a screen. In the closed position with the drawer in place in the housing, leaves and other debris brought down the leader pipe by rain water are accumulated about the screen in the drawer. Rain water then runs through to the leader pipe below. Periodically, the drawer may be removed from the box-like housing by means of a convenient handle and the debris disposed of by overturning and tapping the drawer. It is not necessary for the operator, at any point, to handle the leaves or debris. Furthermore, there is no necessity to use a ladder or climb on a roof. Exposure to injury is thereby drastically reduced or eliminated and the difficulty and unpleasantness of working with wet, dirty or icy debris in cold or inclement weather is avoided.

The device is particularly suited to use in conjunction with drywells. Drywells are a widely used means of handling and disposing of large volumes of rain water run-off from homes and other buildings prior to, or in lieu of, entry into storm sewers.

Drainage pipes or tiles are installed in an underground trench about a foot below the surface near the downspout. The trench slopes about ½ inch per foot as it runs away from the house to a drywell. A drywell, generally used when a storm sewer is not available, is a large hole in the ground filled with rocks and covered with planks, a concrete slab, or shingles to keep out top soil. A recurring problem is that leaves and debris from gutters tend to accumulate in drywells leading to poor drainage and expensive repair.

The improvements inherent in the device of this invention lead to keeping drywells relatively free from leaves and debris accumulating in gutters.

Suitable materials for construction of this device include sheet metal, tin, aluminum, copper, lead, and other metals and alloys, such as brass, stainless steel, etc. It is further anticipated that the device can be formed from plastics by the techniques of injection molding, extrusion, blow molding, compression molding, by lay-up and curing of prepregs and by other appropriate techniques. Suitable plastics for this purpose include impact polystyrene, ABS, polyacetal, nylon, polyester, both thermoplastic and thermoset, glass-reinforced polyester, polyvinyl chloride and copolymers, polymethyl methacrylate, etc. Especially desirable are those plastics exhibiting improved weatherability. These include the above plastics suitably stabilized with appropriate UV absorbers, such as the hydroxybenzophenones and the hydroxybenzotriazoles. In addition, plastics with inherently improved weatherability are even more desirable. These include the so-called "weatherable" ABS, in which the polybutadiene rubber is replaced with ethylenepropylene rubber or by acrylic rubbers, and impact-modified polyvinyl chloride, in which the impact modifier is an acrylic rubber.

Advantages arising from the fabrication of this device from plastic will be apparent to those skilled in the art. Ease of fabrication inherent in the techniques of injection molding and extrusion is exhibited by plastics materials. The labor involved in the construction of the devices is virtually eliminated through the use of plastics and plastics fabricating techniques. Nails, studs, braids, and other collecting devices are eliminated. Points of connection are eliminated. Many other advantages result, such as the avoidance of adhesives, elimination of sharp edges, ease of insertion of reinforcing members, thinning of less essential walls, etc.

A special feature of the device of this invention is that it may be positioned in the leader pipe at a convenient height for easy removal of the drawer and disposition of leaves and debris. In general, this height will be between three and seven feet from the ground. It is generally desired to have the device positioned above the reach of small children, yet not too high for an adult to reach the drawer handle and conveniently remove the drawer.

The device which is generally placed flush with the house wall or house corner may be positioned for either right-handed or left-handed removal of the drawer. Positioning allows for the avoidance of various types of obstacles or obstructions, including windows, shutters, shrubs, etc.

Figure 2A:
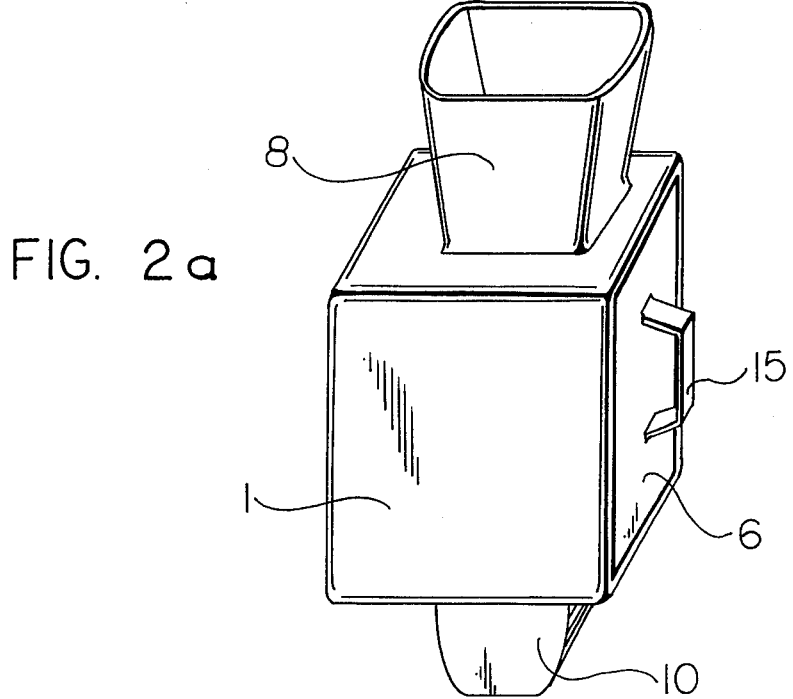
Figure 2B:
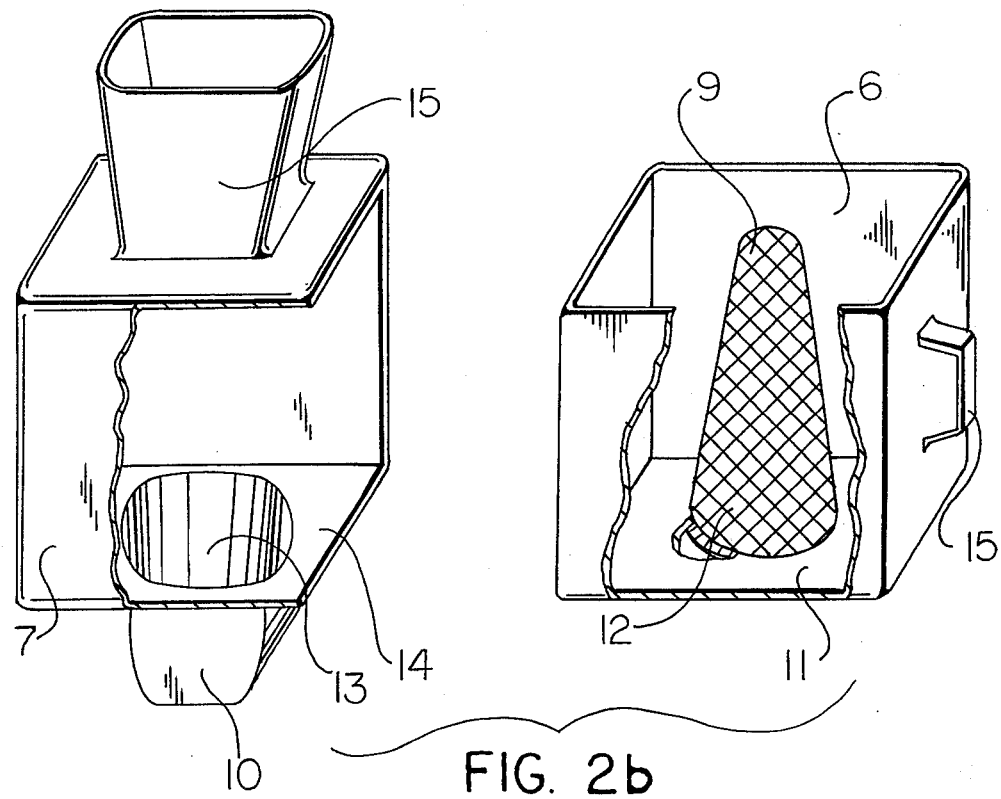

The above and other objects, advantages and features of the present invention will become more readily apparent in the following detailed description of a now preferred embodiment thereof, taken in conjunction with the accompanying drawing wherein FIG. 1 is a composite drawing showing the insertable device 1 in position in the leader pipe 2, 3 and 4, the latter attached to the gutter 5. FIG. 2a shows the insertable device in fully closed position and FIG. 2b shows the device in separated or "exploded" view, with the drawer 6 removed as well as the empty housing 7.

Referring now to FIG. 1, there is shown the insertable device 1 coaxial with the leader pipe 2 and 3, which receives rain water from the gutter 5 on the roof, and additional leader pipe and standpipe 4, which carry the screened rain water away, for example, to a pipe leading into a sewer or other collection area or into a drywell. As shown, the leader pipe 3 leads into one end 8 of the insertable device 1, which end is inwardly tapered to surround the leader pipe to channel rain water containing suspended debris into and over the screen 9 contained in the insertable drawer 6, as shown in FIG. 2b. The other end 10 of the insertable device 1 leads into additional leader pipe or standpipe 4, with the leader pipe or standpipe coaxially surrounding the end 10 from the insertable device 1.

A removable drawer 6 is mounted in the housing 7 between the ends 8 and 10 thereof, the drawer containing and including a supported screen 9 in the shape of an inverted cup, projecting from the base of the drawer up into the drawer, coaxial with the inserted housing and leader pipe or standpipe. The screen is attached to and inherent with the removable drawer, so that on removing the drawer the screen and all of the accumulated debris is removed with it. Furthermore, the screen is of concave configuration in the direction of the drawer base 11. When the drawer is fully inserted into the housing, the opening 12 in the drawer base is lined up with and in register with the opening 13 in the housing 7. Furthermore, the drawer base 11 may contain concentric grooves allowing improved registry with fitting grooves in the housing base 14. Thus, when leaves or other debris have accumulated on the screen to a level reaching above the screen and optionally filling the drawer, the drawer may be removed by grasping handle 15 and emptied.

Advantage of this arrangement is that, in case the drawer is not promptly removed and accumulated leaves back up into the leader pipe, there is less likelihood of damage to the leader pipe, house wall, and environs than if debris accumulates in the gutter as occurs in the prior art examples. Screen 9 in the shape of an inverted cone with a rounded top has the advantage of being self-wiping or self-cleaning during operation, adding to efficiency. Leaves or debris, temporarily settling on the screen, are dislodged by the motion of the water and settle to the bottom of the drawer. It may also be noted that the movable parts in the arrangement are less likely to become immobilized and inoperable than in the case of a slidable cover as in U.S. Pat. No.

3,628,668 where the contact surface is ordinarily larger and more likely to become filled with mud or frozen debris. As shown in FIG. 1 the sleeve end 8 is inwardly tapering surrounding and engaging the leader pipe or standpipe 3 so that all rain water is directed into the leader pipe or standpipe.

In the preferred embodiment shown in the accompanying figures, the insertable device 1 is a box-like structure (designated "The Box"). However, other shapes, including cylindrical, are contemplated, so long as the desired function of the device and components is retained.

The insertable device 1 was installed on a residential house in the manner shown in FIG. 1 by sawing out a section of leader pipe at eye level, positioning the ends of the device onto and connecting with the leader pipe. Shortly after a rain, the device was inspected and the drawer 6 removed. Leaves and debris from the roof had accumulated in the drawer and rain water carried down the leader pipe. The leaves and debris were readily removed by inverting the drawer and tapping.

The roof gutter was also inspected and found to be clear of leaves.

While the invention has been described in terms of a specific embodiment, it will be understood that many variations and modifications may occur to those skilled in the art, particularly as the result of the present teaching.

I claim:

1. A device associated with a leader pipe for receiving rain water from a leader pipe and discharging it into additional leader pipe or standpipe, thence into a drywell, comprising
    (a) a housing for receiving and holding an accumulating drawer,
    (b) an accumulating drawer for insertion in the housing for separating leaves and debris from rain water, the drawer containing and including a screen, which is cone-shaped, rounded on top, and concave downwards with the base fixed in the bottom of the accumulating drawer.

* * * * *